US006432861B1

(12) United States Patent
Breitscheidel et al.

(10) Patent No.: US 6,432,861 B1
(45) Date of Patent: Aug. 13, 2002

(54) REACTION OF ORGANIC COMPOUNDS OVER MACROPOROUS SUPPORTED CATALYSTS COMPRISING BORON OXIDE

(75) Inventors: Boris Breitscheidel, Limburgerhof; Uwe Diehlmann, Neustadt; Alois Kindler, Waldsee; Jochem Henkelmann, Mannheim; Arnd Böttcher, Frankenthal, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/349,082

(22) Filed: Jul. 8, 1999

(30) Foreign Application Priority Data

Jul. 16, 1998 (DE) .......................... 198 32 087

(51) Int. Cl.⁷ .................................................. C08F 8/04
(52) U.S. Cl. .................. 502/103; 502/117; 502/407; 502/414; 502/415; 525/329.1; 525/329.3; 525/328.7; 525/332.8; 525/332.9; 525/333.1; 525/333.2; 525/338; 525/339
(58) Field of Search .................... 525/338, 339; 502/103, 117, 407, 414, 415

(56) References Cited

U.S. PATENT DOCUMENTS 3,716,476 A * 2/1973 Coons, Jr. et al. ............ 208/97
4,062,805 A * 12/1977 Franck et al. ................ 502/154

FOREIGN PATENT DOCUMENTS

| EP | 814098 | 12/1997 |
| FR | 2561945 A | * 10/1985 |

* cited by examiner

*Primary Examiner*—Bernard Lipman
(74) *Attorney, Agent, or Firm*—Keil & Weinkauf

(57) ABSTRACT

In a process for reacting an organic compound in the presence of a catalyst comprising, as active metal, at least one metal of transition group VIII of the Periodic Table, either alone or together with at least one metal of transition group I or VII of the Periodic Table, in an amount of from 0.01 to 30% by weight, based on the total weight of the catalyst, applied to a support containing macropores, the support comprises, as a support component, boron(III) oxide in an amount of from 10 to 100% by weight, based on the total weight of the support.

26 Claims, No Drawings

REACTION OF ORGANIC COMPOUNDS OVER MACROPOROUS SUPPORTED CATALYSTS COMPRISING BORON OXIDE

The present invention relates to a process for reacting organic compounds in the presence of a catalyst which comprises at least one metal of transition group VIII of the Periodic Table applied to a support, where the support has macropores and comprises boron(III) oxide. Furthermore, the present invention relates to such a catalyst support and such a catalyst itself, and also to processes for producing them. Among reactions of organic compounds, particular preference is given according to the present invention to the hydrogenation of polymers containing C—C multiple bonds.

In the past, homogeneous and heterogeneous catalysts have been described for reactions of organic compounds. For the prior art existing in this field, reference may be made to EP-A 0 814 098. That application relates to a process for reacting organic compounds in the presence of a catalyst comprising ruthenium or palladium and, if desired, one or more further metal(s) of transition groups I, VII and VIII of the Periodic Table as active metals on a support, where this support has a specific pore size distribution and both mesopores and macropores. Furthermore, that application gives a detailed description of the relevant prior art.

It is an object of the present invention to provide a further improved process for reacting organic compounds, in particular for the selective hydrogenation of polymers having C—C multiple bonds, which makes possible high conversions at high space velocities over the catalyst and long catalyst operating lives without further hydrogenatable units present in the polymer, e.g. aromatic units or nitrile or alcohol groups, being attacked.

We have found that this object is achieved by the use of a catalyst which comprises a support containing macropores and comprising boron(III) oxide. The catalyst used gives the desired target compound with high selectivity even at a high space velocity over the catalyst and enables long catalyst operating lives to be achieved.

The present invention accordingly provides a process for reacting an organic compound in the presence of a catalyst comprising, as active metal, at least one metal of transition group VIII of the Periodic Table, either alone or together with at least one metal of transition group I or VII of the Periodic Table, in an amount of from 0.01 to 30% by weight, based on the total weight of the catalyst, applied to a support containing macropores, wherein the catalyst comprises, as a support component, boron(III) oxide in an amount of from 10 to 100% by weight, based on the total weight of the support.

COMPOUNDS

The term "organic compound" as used for the purposes of the present invention encompasses all organic compounds which can be reacted catalytically, in particular those containing groups to be treated with hydrogen, e.g. C—C double bonds or C—C triple bonds. It encompasses both low molecular weight organic compounds and polymers. "Low molecular weight organic compounds" are, for the present purposes, compounds having a weight average molecular weight of less than 500. The term "polymer" refers to molecules having a weight average molecular weight of more than about 500.

In particular, the present invention provides a process for reacting an organic compound in the presence of a catalyst as defined herein where the reaction is a hydrogenation, dehydrogenation, hydrogenolysis, aminating hydrogenation or dehalogenation, preferably a hydrogenation.

Here, it is possible to use, in particular, organic compounds which contain one or more of the following structural units:

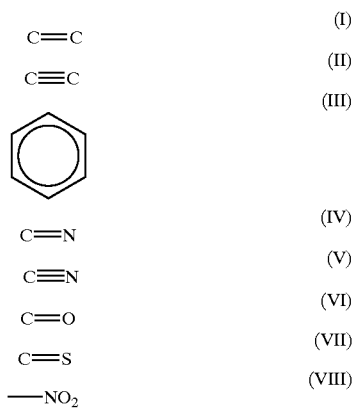

The process of the present invention is particularly suitable for the reaction, preferably hydrogenation, of an organic compound selected from the group consisting of aromatic compounds in which at least one hydroxyl group is bound to an aromatic ring, aromatic compounds in which at least one amino group is bound to an aromatic ring, ketones, aldehydes, carboxylic acids and derivatives thereof, polymers having at least one C—C double bond, polymers having at least one C=O group, polymers having at least one C=N group and mixtures of two or more thereof.

In the process of the present invention, it is also possible to react organic compounds which comprise units of different structures as defined above, e.g. organic compounds which have both C—C multiple bonds and carbonyl groups, since the catalysts used in the process of the present invention are able to selectively react, preferably hydrogenate, one of the two groups, i.e. one type of group can be hydrogenated to an extent of from about 90 to 100% while the other type of group is initially reacted, preferably hydrogenated, to an extent of less than 25% and generally to an extent of from 0 to about 7%. In general, the C—C multiple bonds are reacted or hydrogenated first and the C=O groups are reacted or hydrogenated subsequently.

The term "aromatic compound in which at least one hydroxyl group is bound to an aromatic ring" or "aromatic compound in which at least one amino group is bound to an aromatic ring" refers to all compounds which include a unit of the following structure (IX):

where R is a hydroxyl group or an amino group.

If aromatic compounds in which at least one hydroxyl group and, in addition, at least one substituted or unsubstituted $C_1$–$C_{10}$-alkyl radical and/or -alkoxy radical is bound to an aromatic ring are used in the process of the present invention, the isomer ratio of cis- to trans-configured products obtained can be varied within a wide range as a function of the reaction conditions (temperature, solvent).

Furthermore, the compounds obtained can be processed further without additional purification steps. The formation of alkylbenzenes is virtually completely avoided.

As in the case of the above-described compounds in which at least one hydroxyl group is bound to an aromatic ring, the process of the present invention also makes it possible to hydrogenate aromatic compounds in which at least one amino group is bound to an aromatic ring with high selectivity to give the corresponding cycloaliphatic compounds. In the case of amines which are additionally substituted by a $C_1$–$C_{10}$-alkyl radical and/or -alkoxy radical, what has been said above in respect of the ratio of the cis and trans isomers also applies.

In particular, the formation of deamination products, for example cyclohexanes or partially hydrogenated dimerization products such as phenylcyclohexylamines, is virtually completely avoided in this embodiment.

Specifically, the following compounds can be reacted in the process of the present invention:

Aromatic-Compounds in Which at Least One Hydroxyl Group is Bound to an Aromatic Ring The process of the present invention enables aromatic compounds in which at least one hydroxyl group and preferably also at least one substituted or unsubstituted $C_1$–$C_{10}$-alkyl radical and/or -alkoxy radical is bound to an aromatic ring to be reacted, preferably hydrogenated to give the corresponding cycloaliphatic compounds, with it also being possible to use mixtures of two or more of these compounds. The aromatic compounds can be monocyclic or polycyclic aromatic compounds. The aromatic compounds contain at least one hydroxyl group which is bound to an aromatic ring; the simplest compound of this group is phenol. The aromatic compounds preferably have one hydroxyl group per aromatic ring. The aromatic compounds can be substituted on the aromatic ring or rings by one or more alkyl and/or alkoxy radicals, preferably $C_1$–$C_{10}$-alkyl and/or -alkoxy radicals, particularly preferably $C_1$–$C_{10}$-alkyl radicals, in particular methyl, ethyl, propyl, isopropyl, butyl, isobutyl and/or tert-butyl radicals; among the alkoxy radicals, preference is given to $C_1$–$C_8$-alkoxy radicals such as methoxy, ethoxy, propoxy, isopropoxy, butoxy, isobutoxy and/or tert-butoxy radicals. The aromatic ring or rings and also the alkyl and alkoxy radicals may, if desired, be substituted by halogen atoms, in particular fluorine atoms, or other suitable inert substituents.

Preferably, the compounds which can be reacted, preferably hydrogenated, according to the present invention have at least one, preferably from one to four, in particular one $C_1$–$C_{10}$-alkyl radical which is preferably located on the same aromatic ring as the hydroxyl group or groups. Preferred compounds are (mono)alkylphenols in which the alkyl radical may be in the o, m or p position relative to the hydroxyl group. Particular preference is given to para-alkylphenols, also known as 4-alkylphenols, where the alkyl radical preferably has from 1 to 10 carbon atoms and, in particular, is a tert-butyl radical. Preference is given to 4-tert-butylphenol. Examples of polycyclic aromatic compounds which can be used according to the present invention are β-naphthol and α-naphthol.

The aromatic compounds in which at least one hydroxyl group and preferably also at least one substituted or unsubstituted $C_1$–$C_{10}$-alkyl radical and/or alkoxy radical is bound to an aromatic ring may also have a plurality of aromatic rings which are linked via an alkylene radical, preferably a methylene group. The linking alkylene group, preferably methylene group, can have one or more alkyl substituents which may be $C_1$–$C_{20}$-alkyl radicals and are preferably $C_1$–$C_{10}$-alkyl radicals, particularly preferably methyl, ethyl, propyl, isopropyl, butyl or tert-butyl radicals. Here, each of the aromatic rings can contain at least one bound hydroxyl group. Examples of such compounds are bisphenols which are linked in the 4 position via an alkylene radical, preferably a methylene radical.

In the process of the present invention, particular preference is given to reacting a phenol substituted by a $C_1$–$C_{10}$-alkyl radical, preferably a $C_1$–$C_6$-alkyl radical, where the alkyl radical may be substituted by an aromatic radical, or a mixture of two or more compounds of this type.

In a further preferred embodiment of the present process, p-tert-butylphenol, bis(p-hydroxyphenyl)dimethylmethane or a mixture thereof is reacted.

Aromatic Compounds in Which at Least One Amino Group is Bound to an Aromatic Ring The process of the present invention also enables aromatic compounds in which at least one amino group is bound to an aromatic ring to be reacted, preferably hydrogenated to give the corresponding cycloaliphatic compounds, with it also being possible to use mixtures of two or more of these compounds. The aromatic compounds can be monocyclic or polycyclic aromatic compounds. The aromatic compounds contain at least one amino group which is bound to an aromatic ring. The aromatic compounds are preferably aromatic amines or diamines. The aromatic compounds may be substituted on the aromatic ring or rings or on the amino group by one or more alkyl and/or alkoxy radicals, preferably $C_1$–$C_{20}$-alkyl radicals, in particular methyl, ethyl, propyl, isopropyl, butyl, isobutyl and/or tert-butyl radicals; among the alkoxy radicals, preference is given to $C_1$–$C_8$-alkoxy radicals such as methoxy, ethoxy, propoxy, isopropoxy, butoxy, isobutoxy and/or tert-butoxy radicals. The aromatic ring or rings and also the alkyl and alkoxy radicals may, if desired, be substituted by halogen atoms, in particular fluorine atoms, or other suitable inert substituents.

The aromatic compound in which at least one amino group is bound to an aromatic ring can also have a plurality of aromatic rings which are linked via an alkylene group, preferably a methylene group. The linking alkylene group, preferably methylene group, may have one or more alkyl substituents which can be $C_1$–$C_{20}$-alkyl radicals, and are preferably $C_1$–$C_{10}$-alkyl radicals, particularly preferably methyl, ethyl, propyl, isopropyl, butyl, sec-butyl or tert-butyl radicals.

The amino group bound to the aromatic ring can likewise be substituted by one or two of the above-described alkyl radicals.

Particularly preferred compounds are aniline, naphthylamine, diaminobenzenes, diaminotoluenes and bis-p-aminophenylmethane or mixtures thereof.

Compounds Containing C=O Groups

The process of the present invention enables compounds containing C=O groups, i.e. especially aldehydes, ketones, carboxylic acids and their derivatives such as carboxylic esters, carboxylic halides and carboxylic anhydrides, and mixtures of two or more of the abovementioned compounds, to be reacted, in particular hydrogenated.

Particular preference is given to using aldehydes and ketones, preferably those having from 1 to 20 carbon atoms, for example formaldehyde, acetaldehyde, propionaldehyde, n-butyraldehyde, valeraldehyde, caproaldehyde, heptaldehyde, phenylacetaldehyde, acrolein, crotonaldehyde, benzaldehyde, o-tolualdehyde, m-tolualdehyde, p-tolualdehyde, salicylaldehyde, anisaldehyde, vanillin, cinnamaldehyde, acetone, methyl ethyl ketone, 2-pentanone, 3-pentanone, 2-hexanone, 3-hexanone, cyclohexanone, isophorone, methyl isobutyl ketone, mesityl oxide, acetophenone, propiophenone, benzophenone, benzalacetone, dibenzalacetone, benzalacetophenone, glycolaldehyde, glyceraldehyde, glyoxal, 2,3-butanedione, 2,4-pentanedione, 2,5-hexanedione, terephthalaldehyde, glutaraldehyde, diethyl ketone, methyl vinyl ketone, acetylacetone, 2-ethylhexanal or mixtures of two or more thereof.

It is also possible to use polyketones such as ethylene/CO copolymers.

Furthermore, it is also possible to react carboxylic acids and derivatives thereof, with preference being given to those having from 1 to 20 carbon atoms. Specific examples are:

carboxylic acids such as formic acid, acetic acid, propionic acid, butyric acid, isobutyric acid, n-valeric acid, trimethylacetic acid (pivalic acid), caproic acid, enanthic acid, caprylic acid, capric acid, lauric acid, myristic acid, palmitic acid, stearic acid, acrylic acid, methacrylic acid, oleic acid, elaidic acid, linoleic acid, linolenic acid, cyclohexanecarboxylic acid, benzoic acid, phenylacetic acid, o-toluic acid, m-toluic acid, p-toluic acid, o-chlorobenzoic acid, p-chlorobenzoic acid, o-nitrobenzoic acid, p-nitrobenzoic acid, salicylic acid, p-hydroxybenzoic acid, anthranilic acid, p-aminobenzoic acid, oxalic acid, malonic acid, succinic acid, glutaric acid, adipic acid, pimelic acid, suberic acid, azelaic acid, sebacic acid, maleic acid, fumaric acid, phthalic acid, isophthalic acid, terephthalic acid;

carboxylic halides such as the chlorides or bromides of the abovementioned carboxylic acids, in particular acetyl chloride or bromide, stearyl chloride or bromide and benzoyl chloride or bromide, which are, in particular, dehalogenated;

carboxylic esters such as the $C_1$–$C_{10}$-alkyl esters of the above mentioned carboxylic acids, in particular methyl formate, ethyl acetate, butyl butyrate, dimethyl terephthalate, dimethyl adipate, methyl (meth)acrylate, butyrolactone, caprolactone, and polycarboxylic esters such as polyacrylic and polymethacrylic esters and their copolymers, and polyesters such as polymethyl methacrylate, on which, in particular, hydrogenolyses, i.e. the conversion of esters into the corresponding acids and alcohols, are carried out;

carboxylic anhydrides such as the anhydrides of the abovementioned carboxylic acids, in particular acetic anhydride, propionic anhydride, benzoic anhydride and maleic anhydride;

carboxamides such as formamide, acetamide, propionamide, stearamide and terephthalamide.

Furthermore, it is also possible to react hydroxycarboxylic acids such as lactic, malic, tartaric or citric acid or amino acids such as glycine, alanine, proline and arginine.

Nitriles

It is also possible to react nitriles, preferably aliphatic and aromatic mononitriles and dinitriles, e.g. acetonitrile, propionitrile, butyronitrile, stearonitrile, isocrotonitrile, 3-butenenitrile, propynenitrile, 3-butynenitrile, 2,3-butadienenitrile, 2,4-pentadienenitrile, 3-hexene-1,6-dinitrile, chloroacetonitrile, trichloroacetonitrile, lactonitrile, phenylacetonitrile, 2-chlorobenzonitrile, 2,6-dichlorobenzonitrile, isophthalonitrile and terephthalonitrile, in particular aliphatic α,ω-dinitriles such as succinonitrile, glutaronitrile, adiponitrile, pimelonitrile and suberonitrile, or aminonitriles such as 4-aminobutanonitrile, 5-aminopentanonitrile, 6-aminohexanonitrile, 7-aminoheptanonitrile and 8-aminooctanonitrile.

Furthermore, the following reactions can be carried out using the process of the present invention:

the hydrogenation of aromatic compounds such as benzene, toluene, xylenes, naphthalene and substituted derivatives thereof, to give the corresponding alicyclic compounds; the hydrogenation of alkenes or alkynes such as ethylene propylene, 1-, 2-butene, 1-, 2-, 3- and 4-octene, butadiene and hexatriene to give the corresponding alkanes; the hydrogenation of nitroalkanes such as nitroethane, nitromethane, nitropropane and 1,1-dinitroethane to give the corresponding amines;

the hydrogenation of imines such as quinonimines, ketimines, ketenimines or aliphatic imines such as propanimine, hexanimine; the dehalogenation of halogen-containing organic compounds, in particular aromatic halogen-containing compounds such as chlorobenzene, bromobenzene, bromotoluenes and chlorotoluenes and also chloroxylenes and bromoxylenes, where, in each case, compounds substituted by a plurality of halogen atoms can also be used; the aminating hydrogenation of, for example, alcohols such as vinyl alcohol.

The process of the present invention also enables oximes to be reacted or secondary amines to be prepared from ketones and primary amines.

Polymers

The catalysts of the present invention can also be used for hydrogenations, dehydrogenations, hydrogenolyses, aminating hydrogenations and dehalogenations of large molecules, preferably polymers.

Accordingly, the present invention also provides a process for reacting a polymer having at least one group which can be reacted catalytically, in the presence of the above-described catalysts, with preference being given to the hydrogenation of polymers containing C=O groups, e.g. polyesters of dicarboxylic acids, unsaturated monocarboxylic acids such as poly(meth)acrylates, olefin/CO copolymers or polyketones, the hydrogenation of polymers containing nitrile groups, e.g. styrene-butadiene-acrylonitrile copolymers, the aminating hydrogenation of polyvinyl alcohols and polyketones and the hydrogenation of polymers containing C—C multiple bonds.

In particular, the present invention provides a process for hydrogenating a polymer which has at least one C=O group, a polymer which has at least one C=N group or a polymer which has at least one C—C multiple bond, in the presence of the abovementioned catalyst.

The term "polymer having at least one unit which can be reacted catalytically" refers to all polymers which have such units, in particular polymers comprising units of the structures (I) to (VIII) as defined above in respect of the monomeric compounds, or a halogen atom. Naturally, the polymers in question comprise at least one such unit and it is also possible for one or more units of two or more of the structures (I) to (VIII) to be present in the polymer which is reacted according to the present invention.

The weight average molecular weight of the polymers reacted in the process of the present invention is generally from about 500 to about 500,000, preferably from about 1000 to about 100,000 and more preferably from about 1000 to about 50,000. However, it is also possible for polymers having a higher molecular weight up to one or more millions to be reacted. If polymers containing at least one C—C multiple bond, i.e. polymers having repeating units of the above-defined structures (I) and (II), are reacted, these generally have a weight average molecular weight of from about 5000 to about 1,000,000, preferably from 50,000 to 500,000 and more preferably from 150,000 to 500,000.

Preference is given to using polymers containing olefinic double bonds, more preferably polymers comprising diene units and copolymers having vinylaromatic and diene units.

Diene units which can be used include all conventional, multiply unsaturated monomers having from three to twelve carbon atoms, with preference being given to butadiene.

If copolymers are to be hydrogenated, these may have a random, block-type or tapered distribution of the repeating units.

Aromatic monomers which may be present in the polymers to be hydrogenated according to the present invention include monovinyl- and polyvinyl-substituted aromatic compounds, with preference being given to using styrene, α-methylstyrene, acrylonitrile, methacrylonitrile and divinylbenzene. Furthermore, mixtures of vinylaromatic and/or diolefin monomers, if desired together with conventional olefinic monomers, may also be present in the polymers to be hydrogenated.

Examples of polymers which can be reacted, preferably hydrogenated, in the process of the present invention are: polymers having C—C double bonds, e.g. polybutadienes such as poly(2,3-dimethylbutadiene), polyisoprene, polyacetylene and polycyclopentadienes and polycyclohexadienes; polymers having C—C triple bonds, e.g. polydiacetylenes; polymers comprising aromatic groups, e.g. polystyrene, acrylonitrile-butadiene-styrene terpolymers and styrene-acrylonitrile copolymers; polymers having C═N triple bonds, e.g. polyacrylonitrile, acrylonitrile copolymers with, for example, vinyl chloride, vinylidene chloride, vinyl acetate or (meth)-acrylic esters or mixtures of two or more thereof as comonomers; polymers having C—O double bonds, e.g. polyesters, polyacrylamides, polyacrylic acids, polyureas and polyketones; polymers having C—S double bonds, e.g. polysulfones and polyether sulfones; halogen-containing polymers such as polyvinyl chloride and polyvinylidene chloride; and also polymers containing nitro groups which can be obtained by nitration of, for example, polyolefins by a polymer-analogous reaction.

Further examples of polymers which are preferably reacted in the process of the present invention include polyisoprene, polybutadiene, ethylene/CO copolymers, propylene/CO copolymers, polymethyl (meth)acrylate, polyterephthalates, polyadipates, styrene-butadiene copolymers, acrylonitrile-butadiene copolymers, acrylonitrile-styrene-butadiene copolymers, styrene-isoprene-styrene triblock copolymers, styrene-butadiene-styrene triblock copolymers and styrene-butadiene-styrene star-block copolymers.

In general, complete reaction of the starting materials used takes place. However, the reaction, preferably hydrogenation, can also be carried out in such a way that, by appropriate selection of temperature and, for example, $H_2$ pressure and amount of $H_2$, only one type of hydrogenatable groups is hydrogenated while the other type of hydrogenatable groups is not hydrogenated.

The process of the present invention is particularly suitable for reacting, preferably hydrogenating, polymers which comprise units of various structures as defined above, e.g. polymers having both C—C multiple bonds and C═O groups and/or C═N groups, since the catalysts used in the process of the present invention are able to selectively react the C—C multiple bonds first, i.e. achieve a conversion of from about 60 to 100% of these groups while the C═O and/or C═N groups and/or aromatics are initially reacted, e.g. hydrogenated, to an extent of less than 25% and generally in a range from 0 to about 7%, preferably from 0 to about 2%.

Furthermore, the process of the present invention is particularly well suited to the hydrogenation of polymers having a high molecular weight and containing both C—C multiple bonds and aromatic groups since the catalysts used in the process of the present invention are able to achieve hydrogenation of the C—C multiple bonds, e.g. ethylenically unsaturated regions, to an extent of from about 60 to 100% while at the same time the aromatic regions are hydrogenated to an extent of less than 25% and in general to an extent of from 0 to about 7%, preferably from 0 to about 2%.

After the reaction of the C—C multiple bonds present in the polymers is complete, it is of course possible to react, e.g. hydrogenate, the remaining unsaturated groups, e.g. C═O groups, present in the polymer virtually quantitatively by feeding in further hydrogen.

The process of the present invention can be used both for polymers which have already been isolated and for living polymers.

Supports

The support materials which can be used for producing the catalysts used according to the present invention contain macropores. Here, the term "macropores" refers to pores whose diameter exceeds 50 nm, in accordance with the definition in *Pure Applied Chem.* 45, p. 71 ff in particulars. 79, (1976).

In addition, they comprise, as a support component, boron(III) oxide in an amount of from about 10 to about 100% by weight, preferably from about 30 to about 70% by weight and in particular from about 40 to about 60% by weight, in each case based on the total weight of the support.

As further support components, it is in principle possible to use all support materials known for the production of catalysts. Examples which may be mentioned are activated carbon, silicon carbide, aluminum oxide, silicon dioxide, titanium dioxide, zirconium dioxide, magnesium oxide, zinc oxide or mixtures thereof, with preference being given to using aluminum oxide, silicon dioxide, titanium dioxide, zirconium dioxide, magnesium oxide, zinc oxide or mixtures thereof, in particular aluminum oxide or zirconium dioxide.

The supports preferably have a specific surface area of at least 3 $m^2/g$, preferably at least 5 $m^2/g$, particularly preferably at least 8 $m^2/g$, with the upper limit being 350 $m^2/g$. The surface area of the support is determined by the BET method using $N_2$ adsorption, in particular in accordance with DIN 66131.

The supports preferably have a pore volume of from 0.1 to 2.0 ml/g, preferably from 0.2 to 1.0 ml/g, particularly preferably from 0.4 to 0.8 ml/g.

The macroporosity of the support, i.e. the proportion of the total pore volume made up by macropores, is preferably at least 60%, more preferably at least 90% and in particular at least 99%, in each case based on the total pore volume of the support. The pore volume and the pore volume distribution are determined by Hg porosimetry, in particular in accordance with DIN 66133.

The support materials which can be used for producing the catalysts used according to the present invention are preferably produced by mixing boron(III) oxide and, if desired, one or more further support components with a crosslinked, partially neutralized polyacrylate which can bind 10 times its own weight of water, and a swelling agent, shaping the composition obtained in this way, drying and calcining.

The present invention thus also provides a process for producing a catalyst support, which comprises the following steps (i) to (iv):
(i) mixing a support material which comprises from 10 to 100% by weight of boron(III) oxide with a crosslinked, partially neutralized polyacrylate which can bind at least 10 times its own weight of water and a swelling agent to give a support composition,
(ii) shaping the support composition obtained in step (i),
(iii) drying the shaped support composition obtained in step (ii), and
(iv) calcining the dried support composition obtained in step (iii), and also provides the corresponding catalyst support itself.

Polyacrylates used are preferably homopolymers of acrylic acid, as well as copolymers which comprise at least 50% by weight of acrylic acid. These polymers are partially, i.e. to an extent of at least 5%, or fully neutralized, preferably with sodium hydroxide. The compounds are crosslinked, with these crosslinks being able to be formed by means of ionic interactions, hydrogen bonds and chemical bonds. Possible chemical crosslinkers are, for example, diols such as ethylene glycol, polyols, diamines and dienes in amounts of from 0.1 to 5% by weight of the polymer. Such polymers can bind up to 1000 times their own weight of water. They are usually prepared by free-radical polymerization in aqueous solution and are commercially available as thickeners or as superabsorbers (cf. F. L. Buchholz, "Preparation and Structure of Polyacrylates", in Absorbent Polymer Technology, Studies in Polymer Science 8, Elsevier, Amsterdam, 1990, p. 23; EP-A 324 385, U.S. Pat. No. 5,149,334, U.S. Pat. No. 4,286,082, U.S. Pat. No. 4,295,987, U.S. Pat. No. 4,351,922), whose contents relating to the preparation of the polyacrylates are fully incorporated by reference into the present application.

The weight ratio of support material to polymer is generally from 10:1 to 500:1. The polymer is admixed with a swelling agent. This swelling agent is preferably water or an aqueous ammonia solution, but it is also possible to use all organic substances which can be bound by the polymer, for example $C_1$–$C_6$-alkanols, dialcohols and trialcohols such as glycol, glycerol and propanediol, primary, secondary or tertiary amines such as methylamine, ethylamine, n-propylamine and iso-propylamine. The weight ratio of swelling agent to polymer is from 10:1 to 300:1, preferably from 30:1 to 100:1. The swelling process is generally complete after from 5 to 60 minutes. Support material, polymer and swelling material can be mixed simultaneously. However, it has been found to be advantageous to admix the polymer with the swelling agent first and, after swelling, mix the resulting material with the support material. Mixing can be carried out in a kneader or mix-muller.

The further processing steps are known per se to those skilled in the art. The composition obtained after mixing is shaped, e.g. by extrusion in a screw extruder or by shaping in a ram extruder to form extrudates having the desired dimensions.

The shaped bodies obtained in this way are dried, generally employing temperatures in the range from 100 to 150° C. for from 2 to 24 hours. The shaped bodies are subsequently calcined, generally for from 2 to 24 hours at from 200 to 800° C., preferably from 250 to 550° C., as a result of which the polymers are removed from the support matrix.

Catalysts

The catalysts of the present invention comprise one or more metals of transition group VIII of the Periodic Table, either alone or together with at least one metal of transition group I or VII of the Periodic Table, in an amount of from 0.01 to 30% by weight, preferably from 0.1 to 5% by weight, particularly preferably from 0.2 to 1% by weight, based on the total weight of the catalyst, as active components on supports according to the present invention. As metals of transition group VIII of the Periodic Table, preference is given to using palladium and/or ruthenium, particularly preferably palladium.

In these catalysts, the active components are preferably distributed over the support in the form of an outer shell having a thickness of not more than 500 $\mu$m, preferably not more than 200 $\mu$m, particularly preferably not more than 100 $\mu$m.

The metal surface area of the catalysts is from 0.01 to 10 $m^2$/g, preferably from 0.05 to 5 $m^2$/g, particularly preferably from 0.05 to 3 $m^2$/g. The metal surface area is measured by the chemisorption method, as described in J. Lemaitre et al., "Characterization of Heterogeneous Catalysts", edited by Francis Delanney, Marcel Dekker, New York (1984), pp. 310–324. In the catalysts used according to the present invention, the ratio of the surface area of the metal to the surface area of the support is less than 0.07, preferably less than 0.05, with the lower limit being about 0.0005.

The catalysts used according to the present invention can be produced industrially by applying one or more metals of transition group VIII of the Periodic Table to a support according to the present invention. The application can be achieved by impregnating the support with aqueous or organic metal salt solutions, by spraying appropriate metal salt solutions onto the support or by other suitable methods. Alternatively, the metal salts can also be added during the production of the support by dissolving the metal salts in the swelling agent which is used for swelling the polyacrylates during the production of the support.

Suitable metal salts of transition group VIII of the Periodic Table are the nitrates, nitrosyl nitrates, halides, carbonates, carboxylates, acetylacetonates, chloro complexes, nitro complexes or amine complexes of the corresponding metals, preferably the nitrates, nitrosyl nitrates and acetylacetonates.

In the case of catalysts which contain a plurality of metals of transition group VIII of the Periodic Table, the metal salts or metal salt solutions can be applied simultaneously or in succession.

The supports which have been coated or impregnated with metal salt solution are subsequently dried, preferably at from 50 to 150° C. If desired, the dried supports can be calcined at from 200 to 600° C.

Accordingly, the present invention also provides a catalyst which comprises, as active metal, at least one metal of transition group VIII of the Periodic Table, either alone or together with at least one metal of transition group I or VII of the Periodic Table, in an amount of from 0.01 to 30% by weight, based on the total weight of the catalyst, applied to a support containing macropores, wherein the support comprises, as a support component, boron(III) oxide in an amount of from 10 to 100% by weight, based on the total weight of the support, and also a catalyst which has the following parameters:
  a surface area of the support of at least 3 $m^2$/g,
  a pore volume of the support of from 0.1 ml/g to 2.0 ml/g,
  a proportion of the total pore volume of the support made up by pores having a pore diameter of >50 $\mu$m of at least 60% and
  a distribution of the active components over the support in the form of an outer shell having a thickness of not more than 500 $\mu$m.

More preferably, the catalyst has the following specification:
  amount of boron(III) oxide in the support: from 30 to 70% by weight,
  surface area of the support: at least 5 m$^2$/g,
  pore volume of the support: from 0.2 ml/g to 1.0 ml/g,
  proportion of the total pore volume made up by pores having a pore diameter of >50 nm: at least 90%, and
  distribution of the active component(s) over the support in the form of an outer shell having a thickness of not more than 200 µm.

Particularly preferably, the catalyst used according to the present invention has the following specification:
  amount of boron(III) oxide in the support: from 40 to 60% by weight,
  surface area of the support: at least 8 m$^2$/g,
  pore volume of the support: from 0.4 ml/g to 0.8 ml/g,
  proportion of the total pore volume made up by pores having a pore diameter of >50 nm: at least 99%, and
  distribution of the active component(s) over the support in the form of an outer shell having a thickness of not more than 100 µm.

As indicated by the above, the present invention also provides a process for producing a catalyst as defined above, which comprises the following steps (v) to (vii):

(v) producing a catalyst support as defined above, (vi) bringing the support into contact with a solution or suspension of at least one metal salt of at least one metal of transition group VIII of the Periodic Table alone or of a mixture of at least one metal salt of at least one metal of transition group VIII and at least one metal salt of at least one metal of transition group I or VII of the Periodic Table in such a way that the total amount of the active metal or metals of the Periodic Table is from 0.01 to 30% by weight, based on the total weight of the catalyst, and (vii) drying and, if desired, calcining the dried catalyst.

Solvents or Diluents

In the process of the present invention, the reaction, preferably a hydrogenation, can be carried out in the absence of a solvent or diluent, i.e. it is not necessary to carry out the reaction in solution.

The melt of a polymer can also be reacted directly.

However, preference is given to using a solvent or diluent. Solvents or diluents which can be used are any suitable solvents or diluents. The choice is not critical. For example, the solvents or diluents can also contain small amounts of water.

In the reaction, preferably hydrogenation, of an aromatic compound in which at least one hydroxyl group is bound to an aromatic ring, examples of suitable solvents or diluents include the following:
  straight-chain or cyclic ethers such as tetrahydrofuran or dioxane and also aliphatic alcohols in which the alkyl radical preferably has from 1 to 10 carbon atoms, in particular from 3 to 6 carbon atoms.

Examples of preferred alcohols are i-propanol, n-butanol, i-butanol and n-hexanol.

Mixtures of these or other solvents or diluents can likewise be used.

In the reaction, preferably hydrogenation, of an aromatic compound in which at least one amino group is bound to an aromatic ring, examples of suitable solvents or diluents include the following:
  straight-chain or cyclic ethers such as tetrahydrofuran or dioxane and also ammonia and monoalkylamines or dialkylamines in which the alkyl radical preferably has from 1 to 3 carbon atoms, e.g. methylamine, ethylamine, propylamine or the corresponding dialkylamines.

Mixtures of these or other solvents or diluents can likewise be used.

In both the above embodiments, the amount of solvent or diluent used is not restricted in any particular way and can be chosen freely according to requirements, but preference is given to amounts which lead to a 10–70% strength by weight solution of the compound to be hydrogenated.

In the process of the present invention, particular preference is given to using the product formed in the reaction, preferably hydrogenation, of this process as solvent, if desired together with other solvents or diluents. In this case, part of the product formed in the process can be mixed with the compounds to be reacted, preferably hydrogenated. Based on the weight of the aromatic compounds to be reacted, preferably hydrogenated, preference is given to mixing in from 1 to 30 times, particularly preferably from 5 to 20 times, in particular from 5 to 10 times, the amount of reaction product as solvent or diluent.

What has been said above also applies to the other compounds which can be reacted according to the present invention; these are likewise subject to no restrictions in respect of the solvents and diluents.

In the reaction, preferably hydrogenation, of polymers, examples of suitable solvents or diluents include the following:
  hydrocarbons such as hexane, cyclohexane, methylcyclohexane, heptane, octane, toluene, xylene, etc., and straight-chain or cyclic ethers such as tetrahydrofuran, dioxane, dibutyl ether, methyl tert-butyl ether, etc., ketones such as methyl ethyl ketone and acetone, esters such as ethyl acetate and amides such as DMF and N-methylpyrrolidone.

Preference is given to using cyclohexane, toluene or THF. Mixtures of these and other solvents and diluents can likewise be used.

If the polymer has been obtained by solution polymerization, the resulting solution comprising the polymer can be used directly for reaction in the process of the present invention.

The amount of solvent or diluent used in the process of the present invention is not restricted in any particular way and can be chosen freely according to requirements, but preference is given to amounts which lead to a 1–70% strength by weight, preferably 1–40% strength by weight, solution of the polymer to be reacted.

Reaction

In the following, the reaction is described by way of the example of a hydrogenation; if a dehydrogenation or an oxidation is to be carried out, gaseous hydrocarbons or oxygen-containing gases can be used in place of hydrogen or hydrogen-containing gases under the conditions described below.

The hydrogenation is carried out at appropriate pressures and temperatures. Preference is given to pressures above about $2 \times 10^6$ Pa, preferably above about $5 \times 10^6$ Pa, in particular from about $1 \times 10^7$ to about $3 \times 10^7$ Pa. Preferred temperatures are in a range from about 30 to about 250° C., preferably from about 100 to about 220° C. and in particular from about 150 to about 200° C.

The hydrogenation process can be carried out continuously or batchwise. In the case of a continuous process, part of the hydrogenation product leaving the reactor can be recirculated to the reactor feed upstream of the reactor. Here, the amount of hydrogenation product leaving the reactor which is recirculated as solvent is set so that the ratios described in the subsection "Solvents and diluents" are achieved. The remaining amount of hydrogenation product is taken off.

In a continuous process procedure, the amount of compound or compounds to be hydrogenated is preferably from about 0.05 to about 3 kg per liter of catalyst per hour, more preferably from about 0.1 to about 1 kg per liter of catalyst per hour.

As hydrogenation gases, it is possible to use any gases which comprise free hydrogen and contain no harmful amounts of catalyst poisons such as CO. For example, waste gases from a reformer can be used. Preference is given to using pure hydrogen as hydrogenation gas.

In the case of phenols and amines which are additionally substituted by at least one substituted or unsubstituted $C_1$–$C_{10}$-alkyl and/or -alkoxy radical, the isomer ratio of cis- to trans-configured products obtained can be varied within a wide range as a function of the reaction conditions (temperature, solvent).

If an aromatic compound in which at least one amino group is bound to an aromatic ring is to be hydrogenated by means of the catalyst of the present invention, the hydrogenation can also be carried out in the presence of ammonia or monoalkylamines or dialkylamines, for example methylamine, ethylamine, propylamine or dimethylamine, diethylamine or dipropylamine. Here, preference is given to using from about 0.5 to about 50 parts by weight, particularly preferably from about 1 to about 20 parts by weight, of ammonia or monoalkylamine or dialkylamine, in each case based on 100 parts by weight of the compound or compounds to be hydrogenated. Particular preference is given to using anhydrous ammonia or anhydrous amines.

For oxidations, use is generally made of air or pure oxygen. In the case of dehydrogenations, the customary hydrocarbons, in particular methane or natural gas, are used.

The invention is illustrated by the examples below.

EXAMPLES

Production of Catalyst A 150 ml of water, 20 ml of aqueous 25% strength by weight ammonia solution and 6 g of a polyacrylate "Aqualic CA W3®" were mixed. After 1 hour, a gel-like swollen mass had been formed and this was subsequently admixed with 125 g of aluminum oxide and 125 g of boron(III) oxide and kneaded for 2 hours with addition of a further 90 ml of 25% strength by weight ammonia solution. The composition was extruded in a ram extruder at a pressure of 45 bar to form 2.5 mm extrudates, dried for 16 hours at 120° C. and calcined for 4 hours at 300° C. The support produced in this way consisted of 50% by weight of boron(III) oxide and 50% by weight of aluminum oxide. The BET surface area was 9.7 $m^2/g$. The pore volume was 0.56 ml/g and the macroporosity was 100%, i.e. the support possessed exclusively macropores.

250 g of the boron(III) oxide/aluminum oxide support which had been produced in this way were impregnated four times with 138 ml each time of a solution prepared by dissolving, in each case, 0.91 g of palladium(II) acetylacetonate in 138 ml of acetone. After each impregnation step, the impregnated support was dried for 30 minutes at 70° C. After the fourth drying, a calcination at 200° C. for 2 hours was carried out. The palladium catalyst produced in this way had a palladium content of 0.5% by weight. The palladium component was distributed over the support in the form of an outer shell having a thickness of 50 μm. The palladium surface area of the catalyst was 0.3 $m^2/g$.

Example 1

A tube reactor was charged with 250 ml of catalyst A. The catalyst was activated by treating it at 120° C. with a gas stream consisting of 50% by volume of $H_2$ and 50% by volume of $N_2$. Subsequently, at a temperature of 120° C., a pressure of 120 bar and an $H_2$ flow of 40 l/h, a 10% strength by weight solution of a styrene-butadiene-copolymer "Styroflex®" having a weight average molecular weight of 300,000 in cyclohexane was passed over the catalyst from the bottom upward at a weight hourly space velocity of 0.01 kg/(1·h). The conversion in respect of the olefinic double bonds was 86%. The aromatic rings in the polymer were not hydrogenated. No degradation of the molecular weight was found.

Example 2

A tube reactor was charged with 250 ml of catalyst A. The catalyst was activated by treating it at 120° C. with a gas stream consisting of 50% by volume of $H_2$ and 50% by volume of $N_2$. Subsequently, at a temperature of 120° C., a pressure of 120 bar and an $H_2$ flow of 40 l/h, a 10% strength by weight solution of a styrene-butadiene-copolymer "Styroflex" having a weight average molecular weight of 300,000 in cyclohexane was passed over the catalyst from the bottom upward at a weight hourly space velocity of 0.1 kg/(1·h). The conversion in respect of the olefinic double bonds was 66%. The aromatic rings in the polymer were not hydrogenated. No degradation of the molecular weight was found.

We claim:

1. A process for reacting an organic compound in the presence of a catalyst which comprises hydrogenating a polymer comprising at least one moiety selected from the group consisting of a C—C double bond, a C—O double bond and a C—N triple bond, and wherein the catalyst comprises a) as active metal, ruthenium or palladium or a mixture thereof, either alone or together with at least one metal of transition group I or VII of the Periodic Table, said active metal being present in an amount of from 0.1 to 5% by weight, based on the total weight of the catalyst, and b) a support comprising, as a support component, boron (III) oxide in an amount of from 30 to 70% by weight, based on the total weight of the support, said support having macropores of a pore diameter of >50 nm.

2. The process of claim 1, wherein the support has a specific surface area of at least 3 $m^2/g$.

3. The process of claim 1, wherein the support has a pore volume of from 0.1 ml/g to 2.0 ml/g.

4. The process of claim 1, wherein at least 60% of the total pore volume of the support is made up by the pores having the pore diameter of more than 50 nm.

5. The process of claim 1, wherein the active metal is distributed over the support in form of an outer shell having a thickness of not more than 500 μm.

6. The process of claim 1, wherein the support has a surface area of at least 3 $m^2/g$, the support has a pore volume of from 0.1 ml/g to 2.0 ml/g, at least 60% of the total pore volume of the support is made up by the pores having the pore diameter of >50 nm, and the active metal is distributed over the support in form of an outer shell having a thickness of not more than 500 µm.

7. The process of claim 1, wherein the support comprises boron(III) oxide plus, as further support component, aluminum oxide, silicon oxide, titanium oxide, zirconium dioxide, magnesium oxide, zinc oxide or a mixture of two or more thereof.

8. The process of claim 1, wherein the polymer is selected from the group consisting of polyisoprene, polybutadiene, styrene-butadiene copolymers, acrylonitrile-butadiene copolymers, acrylonitrile-styrene-butadiene terpolymers, styrene-isoprene-styrene triblock copolymers, styrene, butadiene-styrene triblock copolymers and styrene-butadiene-styrene star-block copolymers.

9. A catalyst comprising
   a) as active metal, ruthenium or palladium or a mixture thereof, either alone of together with at least one metal of transition group I or VII of the Periodic Table, said active metal being present in an amount of from 0.1 to 5% by weight, based on the total weight of the catalyst, and
   b) a support comprising, as a support component, boron (III) oxide in an amount of from 30 to 70% by weight, based one the total weight of the support, said support having macropores of a pore diameter of >50 nm.

10. The catalyst defined in claim 9, wherein the support has a surface area of at least 3 $m^2/g$, the support has a pore volume of from 0.1 ml/g to 2.0 ml/g, at least 60% of the total pore volume of the support is made up by the pores having the pore diameter of >50 nm, and the active metal is distributed over the support in form of an outer shell having a thickness of not more than 500 µm.

11. A process for producing a catalyst support comprising, as a support component, boron(III) oxide in an amount of from 30 to 70% by weight, based on the total weight of the support, said support having macropores of a pore diameter of >50 nm, which comprises the following steps (i) to (iv):

(i) mixing a support material which comprises from 30 to 70% by weight of boron(III) oxide with a crosslinked, partially neutralized polyacrylate which can bind at least 10 times its own weight of water and a swelling agent to give a support composition, (ii) shaping the support composition obtained in step (i), (iii) drying the shaped support composition obtained in step (ii), and (iv) calcining the dried support composition obtained in step (iii) at from 200° C. to 800° C.

12. A process for preparing the catalyst defined in claim 9 which comprises the following steps (v) to (vii):

(v) producing a catalyst support by
      $v_i$) mixing a support material which comprises from 30 to 70% by weight of boron(III) oxide with a crosslinked, partially neutralized polyacrylate which can bind at least 10 times its own weight of water and a swelling agent to give a support composition,
      $v_{ii}$) shaping the support composition obtained in step ($v_i$),
      $v_{iii}$) drying the shaped support composition obtained in step ($v_{ii}$), and
      $v_{iv}$) calcining the dried support composition obtained in step ($v_{iii}$) at from 200° C. to 800° C.,
   (vi) impregnating the support with a solution or suspension comprising the active metal in form of at least one salt in such a way that the total amount of the active metal is from 0.1 to 5% by weight, based on the total weight of the catalyst, and
   (vii) drying and optionally calcining the dried catalyst.

13. The process of claim 2, wherein the specific surface area of the support is at least 5 $m^2/g$.

14. The process of claim 2, wherein the specific surface area of the support is at least 8 $m^2/g$.

15. The process of claim 3, wherein the ore volume of the support is of from 0.2 to 1.0 ml/g.

16. The process of claim 3, wherein the pore volume of the support is of from 0.4 to 0.8 ml/g.

17. The process of claim 4, wherein at least 90% of the total pore volume of the support is made up by pores having a pore diameter of more than 50 nm.

18. The process of claim 4, wherein at least 99% of the total pore volume of the support is made up by pores having a pore diameter of more than 50 nm.

19. The process of claim 5, wherein the thickness of the outer shell of formed by the active metal(s) is not more than 200 µm.

20. The process of claim 5, wherein the thickness of the outer shell of formed by the active metal(s) is not more than 100 µm.

21. The process of claim 1, wherein the catalyst has a ratio of less than 0.07 of surface area of the active metal(s) to surface area of the support.

22. The process of claim 21, wherein the ratio of surface area of the active metal(s) to surface area of the support is from about 0.005 to 0.05.

23. The process of claim 21, wherein the ratio of surface area of the active metal(s) to surface area of the support is less than 0.05.

24. The catalyst defined in claim 9, wherein the macropores having a pore diameter of >50 nm contribute at least 60% of the total pore volume of the support.

25. The catalyst defined in claim 9, wherein the macropores having a pore diameter of >50 nm contribute at least 90% of the total pore volume of the support.

26. The catalyst defined in claim 9, wherein the macropores having a pore diameter of >50 nm contribute at least 99% of the total pore volume of the support.

* * * * *

UNITED STATES PATENT AND TRADEMARK OFFICE
CERTIFICATE OF CORRECTION

PATENT NO. : 6,432,861 B1　　　　　　　　　　　　　　　　　　　　Page 1 of 1
DATED : August 13, 2002
INVENTOR(S) : Breitscheidel et al.

It is certified that error appears in the above-identified patent and that said Letters Patent is hereby corrected as shown below:

Column 16,
Line 12, "$v_{iv}$)" should be -- $v_{iv}$) --.
Line 27, "ore" should be -- pore --.

Signed and Sealed this

Twenty-ninth Day of October, 2002

Attest:

Attesting Officer

JAMES E. ROGAN
*Director of the United States Patent and Trademark Office*